Feb. 19, 1935.  J. F. CAMPION  1,992,119
LAWN MOWER
Filed April 24, 1934    2 Sheets-Sheet 1
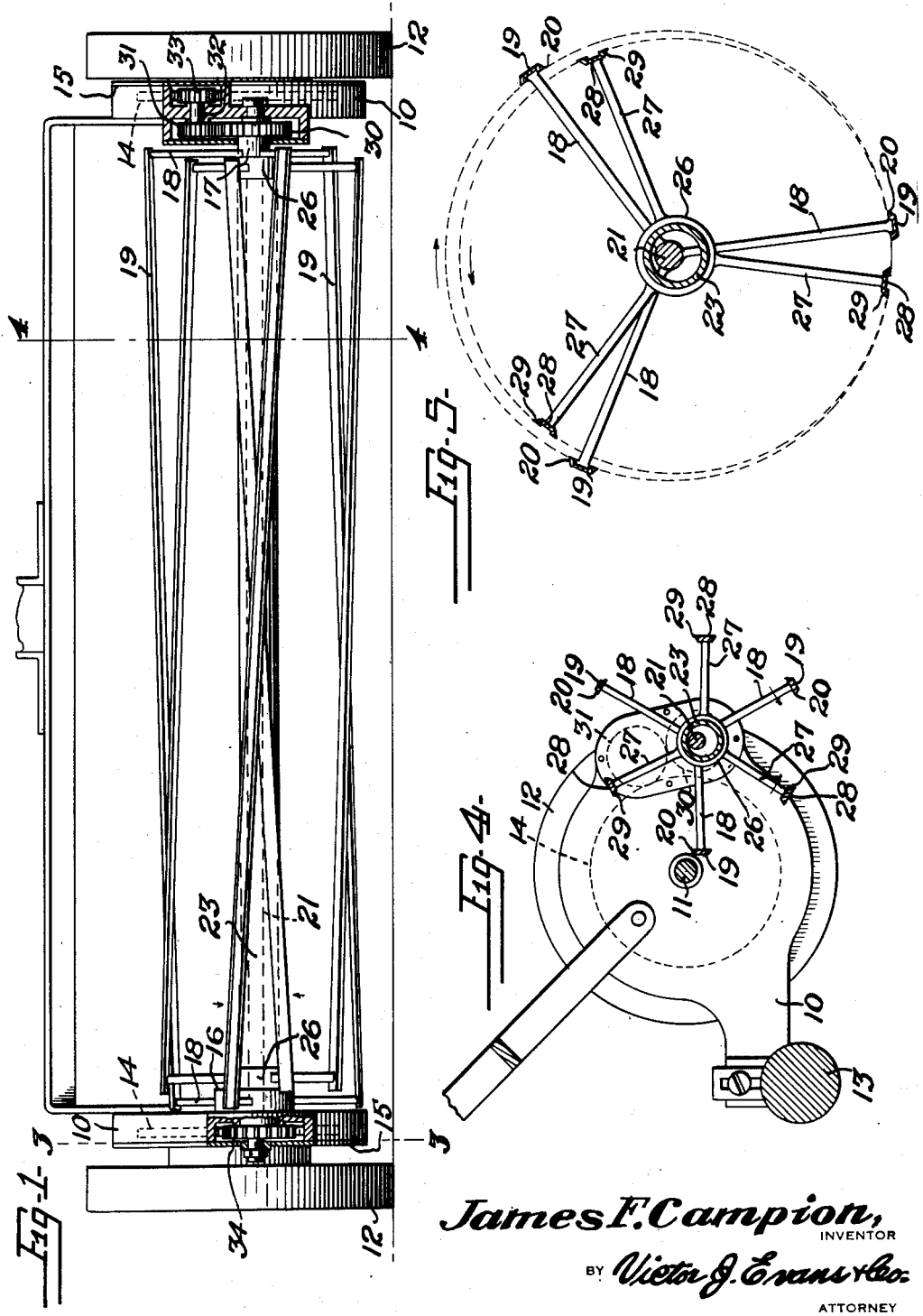
James F. Campion,
INVENTOR
BY Victor J. Evans & Co.
ATTORNEY

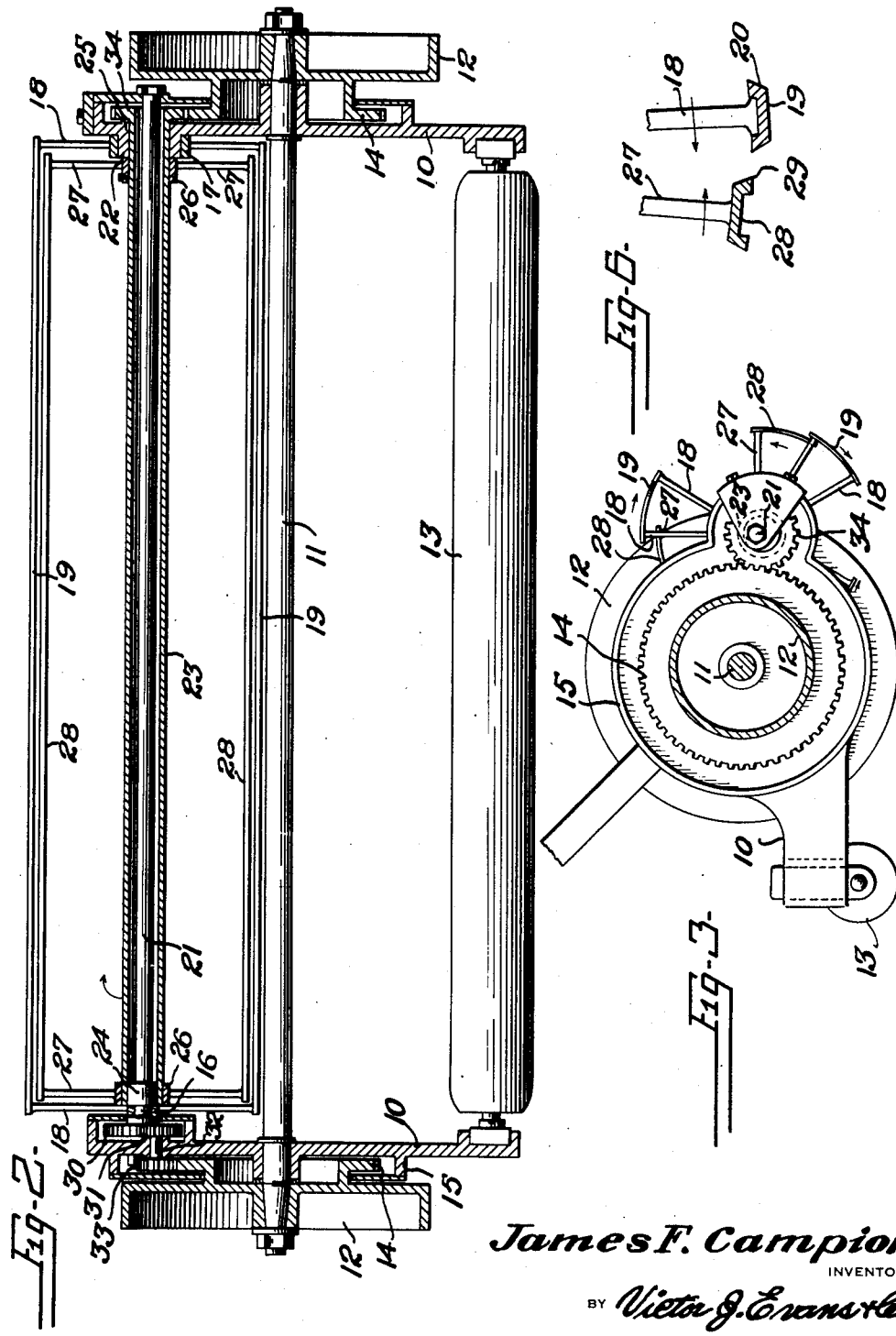

Patented Feb. 19, 1935

1,992,119

UNITED STATES PATENT OFFICE 1,992,119

LAWN MOWER

James F. Campion, Freeport, N. Y.

Application April 24, 1934, Serial No. 722,201

4 Claims. (Cl. 56—249)

The invention relates to a mowing machine and more especially to lawn mowers.

The primary object of the invention is the provision of a machine of this character, wherein there is arranged a pair of revolving cutters, these being related, so that when the machine is advanced or pulled backwardly, a cutting action is had irrespective of the direction of travel of said machine, the revolving cutters being active only at the cutting plane and effective for a shearing action.

Another object of the invention is the provision of a machine of this character, wherein the revolving cutters are interfitted in a novel manner so that one cutter will rotate in one direction and the other in the reverse direction and the shear cutting operation had during the activity of said cutters, so that the machine will cut when the same is pushed forwardly or pulled backwardly, and a positive cut assured.

A further object of the invention is the provision of a machine of this character which is comparatively simple in construction, thoroughly reliable and efficient in its operation, positive in action, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunder appended.

In the accompanying drawings:

Figure 1 is a front elevation of a machine constructed in accordance with the invention, the same being partly in section.

Figure 2 is a horizontal longitudinal sectional view through the machine.

Figure 3 is a sectional view on the line 3—3 of Figure 1.

Figure 4 is a sectional view on the line 4—4 of Figure 1.

Figure 5 is a vertical transverse sectional view through the revolving cutters, showing their relationship and the travel of the same in reverse directions.

Figure 6 is an enlarged sectional view through the blades of the cutters, the same being shown in approaching relation to each other.

Similar reference characters indicate corresponding parts throughout the several views in the drawings.

Referring to the drawings in detail, the lawn mower comprises, as usual, the end castings 10 of the main body frame, these having journaled therein the power shaft 11 supporting ground or traction wheels 12, and adjustably supported by the main body frame, rearwardly with respect to the wheels 12, is a gauge roller or trailing roller 13 which is of conventional type. Carried by the wheels 12 are the gears 14 which are concealed within gear casings 15 carried by the main body frame or the end castings 10 thereof.

Arranged in advance of the roller 13 and between the end castings 10 of the main body are the reversely rotating cutters, one working within the other, and the outermost cutter includes the hubs 16 and 17, respectively, having the radial spokes 18 fitted with cutting blades 19, formed with the oppositely beveled cutting edges 20 at the inner sides thereof. The hubs 16 and 17 are journaled on an axle 21 and a bearing 22, the axle being fitted transversely between the end castings 10, while the bearing 22 is a part of one of said castings. The shaft 21 is fitted within a tubular shaft 23, which, at one end, has the journal fitting 24 with said shaft 21, while the other end of the shaft 22 is journaled, at 25, in one end casting 10. Connected with this tubular shaft 23 are the hubs 26 of the other cutter or innermost cutter and these hubs have the radial spokes 27 carrying the cutting blade 28 provided with the opposite beveled cutting edges 29 at the outer sides thereof. The inner cutter in its rotary mounting is eccentric to the outer cutter, so that the cutting action of these cutters will be at the lowermost point of the rotary path of the outermost cutter and the cutting blades 19 and 28 are curvilinear in reverse directions so that a shear cutting action is had.

The shaft 21 has at one end the gear 30 meshing with a pinion 31, its arbor 32 being journaled in one of the end castings 10 and having the pinion 33 meshing with one of the gears 14. The tubular shaft 23 at one end is formed with the gear 34 meshing with the other gear 14, thus it being seen that these cutters rotate in reverse directions whether the machine is advanced or pulled backwardly, so that a positive shear cutting action is had whether the machine is carried forwardly or backwardly.

The gear casings 15 confine all gearing of the machine and such gear casings are arranged for this purpose.

It is, of course, understood that the gear 30 is either fast on the shaft 21 or with the hub 16 of the outer cutter, because it is necessary that the outer cutter be positively driven by the said gear 30.

The power for driving the cutters is transferred from the ground or traction wheels 12, as will be obvious.

It is, of course, understood that the blades 19 and 28 are slightly arched consistently with each other corresponding to the circular path of movement, so that the cutting edges at opposite sides of these blades will meet each other.

What is claimed is:

1. A mowing machine having reversely rotating cutters arranged for travel one within the other, and means eccentrically mounting the innermost cutter relative to the outermost cutter to dispose cutting action at the lowermost point of rotary path of movement of said cutters.

2. A mowing machine having reversely rotating cutters arranged for travel one within the other, and means eccentrically mounting the innermost cutter relative to the outermost cutter to dispose cutting action at the lowermost point of rotary path of movement of said cutters, the cutters having reversely curvilinear contour in the direction of their length.

3. A mowing machine having reversely rotating cutters arranged for travel one within the other, means eccentrically mounting the innermost cutter relative to the outermost cutter to dispose cutting action at the lowermost point of rotary path of movement of said cutters, the cutters having reversely curvilinear contour in the direction of their length, and beveled cutting edges at opposite sides of said cutters.

4. A mowing machine having reversely rotating cutters arranged for travel one within the other, means eccentrically mounting the innermost cutter relative to the outermost cutter to dispose cutting action at the lowermost point of rotary path of movement of said cutters, the cutters having reversely curvilinear contour in the direction of their length, and beveled cutting edges at opposite sides of said cutters, the cutters being consistently arched with respect to each other for the meeting of the cutting edges on the reverse rotary action thereof.

JAMES F. CAMPION.